United States Patent
Nehl et al.

(10) Patent No.: US 11,323,001 B2
(45) Date of Patent: May 3, 2022

(54) SEGMENTED BAR CONDUCTORS FOR ELECTRIC MACHINES

(71) Applicant: GM GLOBAL TECHNOLOGY OPERATIONS LLC, Detroit, MI (US)

(72) Inventors: Thomas W. Nehl, Shelby Township, MI (US); Alireza Fatemi, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 16/460,138

(22) Filed: Jul. 2, 2019

(65) Prior Publication Data
US 2021/0006115 A1   Jan. 7, 2021

(51) Int. Cl.
*H01B 5/08* (2006.01)
*H02K 3/14* (2006.01)
(Continued)

(52) U.S. Cl.
CPC .............. *H02K 3/14* (2013.01); *B60K 1/00* (2013.01); *H02K 1/16* (2013.01); *H02K 1/276* (2013.01);
(Continued)

(58) Field of Classification Search
CPC .......... H02K 3/14; H02K 1/16; H02K 1/276; H02K 3/02; H02K 3/34; H02K 7/006;
(Continued)

(56) References Cited

U.S. PATENT DOCUMENTS 2,990,508 A   6/1961   Thompson
5,166,568 A   11/1992  Nystuen et al.
(Continued)

FOREIGN PATENT DOCUMENTS

DE   112008000175 T5 * 12/2009   .............. H02K 3/14
JP      2017107802 A  *  6/2017
WO   WO-2015162586 A2 * 10/2015   ......... H02K 15/0081

OTHER PUBLICATIONS

Vander Vorst, Rosen and Kotsuka, RF/Microwave Interaction with Biological Tissues, (2006 John Wiley & Sons, Inc.) Chapter One Fundamentals of Electromagnetics (Year: 2006).*
(Continued)

*Primary Examiner* — Tulsidas C Patel
*Assistant Examiner* — Robert E Mates
(74) *Attorney, Agent, or Firm* — Quinn IP Law (57) ABSTRACT

Presented are segmented hairpin bar conductors for electric machines, methods for making/using such segmented bar conductors, electromagnetic motors using such segmented bar conductors, and vehicles equipped with an induction motor generator unit using segmented hairpin bar conductors. An electric machine includes a stator that defines multiple circumferentially spaced, radially elongated stator slots. A rotor is located adjacent and movable with respect to the stator. One or more permanent magnets are mounted to the rotor, and one or more U-shaped hairpin windings are mounted to the stator in juxtaposed spaced relation to the magnet(s). Each hairpin winding is formed from an array of collimated, electrically conductive wires that are bundled together into a unitary bar conductor. The segmented hairpin winding has a pair of hairpin legs, each of which adjoins and projects from a respective end of a hairpin crown. Each hairpin leg inserts into a respective one the stator slots.

18 Claims, 4 Drawing Sheets

(51) Int. Cl.
*H02K 1/16* (2006.01)
*H02K 1/276* (2022.01)
*H02K 3/02* (2006.01)
*B60K 1/00* (2006.01)
*H02K 3/34* (2006.01)
*H02K 15/03* (2006.01)
*H02K 15/06* (2006.01)
*H02K 15/10* (2006.01)
*H02K 7/00* (2006.01)

(52) U.S. Cl.
CPC ............... *H02K 3/02* (2013.01); *H02K 3/34* (2013.01); *H02K 7/006* (2013.01); *H02K 15/03* (2013.01); *H02K 15/064* (2013.01); *H02K 15/105* (2013.01); *H01B 5/08* (2013.01); *H02K 2213/03* (2013.01)

(58) Field of Classification Search
CPC .... H02K 15/03; H02K 15/064; H02K 15/105; H02K 2213/03; H01B 5/08
USPC .............. 310/179, 201, 208, 310; 174/128.1, 174/128.2, 115
See application file for complete search history.

(56) References Cited

U.S. PATENT DOCUMENTS

| | | | |
|---|---|---|---|
| 6,163,127 A | 12/2000 | Patel et al. | |
| 6,674,205 B2 | 1/2004 | Biais et al. | |
| 7,969,058 B2 | 6/2011 | Rahman et al. | |
| 8,684,257 B2 | 4/2014 | Osborne et al. | |
| 8,928,197 B2 | 1/2015 | Jurkovic et al. | |
| 8,933,606 B2 | 1/2015 | Rahman et al. | |
| 9,866,092 B2 | 1/2018 | Hanna et al. | |
| 2004/0187293 A1* | 9/2004 | Bradfield | H02K 15/0018 29/854 |
| 2005/0248229 A1* | 11/2005 | Even | H02K 3/28 310/201 |
| 2006/0017345 A1 | 1/2006 | Uchida et al. | |
| 2007/0216249 A1 | 9/2007 | Gruendel et al. | |
| 2009/0045688 A1 | 2/2009 | Liang et al. | |
| 2010/0244610 A1 | 9/2010 | Hao et al. | |
| 2011/0062902 A1 | 3/2011 | Patel et al. | |
| 2011/0109180 A1 | 5/2011 | Akutsu et al. | |
| 2011/0169363 A1 | 7/2011 | Summers et al. | |
| 2011/0198962 A1 | 8/2011 | Tang | |
| 2013/0049516 A1 | 2/2013 | Kleber et al. | |
| 2013/0049518 A1 | 2/2013 | Kleber et al. | |
| 2013/0127291 A1 | 5/2013 | Agapiou et al. | |
| 2013/0147303 A1 | 6/2013 | Kaiser et al. | |
| 2013/0270952 A1 | 10/2013 | Jurkovic et al. | |
| 2014/0252903 A1 | 9/2014 | Rahman et al. | |
| 2016/0036277 A1* | 2/2016 | Lynch | H02K 3/34 310/54 |
| 2020/0169149 A1* | 5/2020 | Liang | H02K 3/28 |

OTHER PUBLICATIONS

Middleton and Davis, Skin Effect in Large Stranded Conductors at Low Frequencies, Journal A.I.E.E. (Sep. 1921) (Year: 1921).*
Stock (WO 2015162586 A2) English Translation (Year: 2015).*
Tanabe (DE 112008000175 T5) English Translation (Year: 2009).*
Inagaki (JP 2017107802 A) English Translation (Year: 2017).*

* cited by examiner

SEGMENTED BAR CONDUCTORS FOR ELECTRIC MACHINES

INTRODUCTION

The present disclosure relates generally to electric machines. More specifically, aspects of this disclosure relate to electrical bar conductors for "hairpin" wound stators of multi-phase induction motors of hybrid-electric and full-electric vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, six-stroke architectures, and rotary engines, as some non-limiting examples. Hybrid electric and full electric vehicles, on the other hand, utilize alternative power sources to propel the vehicle, such as battery-powered or fuel-cell-powered traction motors, and therefore minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel supply system, and exhaust system of an ICE-based vehicle are replaced with a single or multiple traction motors, a traction battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, hybrid electric vehicle (HEV) engines may be turned off, in whole or in part, while the vehicle is propelled by the electric motor(s).

While innumerable designs are available, there are three primary types of electric machines used for traction motors in modern electric-drive vehicle powertrains: brushed direct current (DC) motors, brushless permanent magnet (PM) motors, and multi-phase alternating current (AC) motors. Permanent magnet motors have a number of operating characteristics that make them more attractive for use in vehicle propulsion applications when compared to their available counterparts, including high efficiency, torque, and power density, and extended constant-power operating ranges. Traction motors convert electrical energy into rotational mechanical energy using a stator with multiphase electromagnetic windings, such as electrically conductive "hairpin" bars, and a rotatable rotor that bears an engineered pattern of magnets. A conventional hairpin conductor is cut from extruded metal bar stock, bent into a U-shaped winding, and inserted into slots of the stator's core. The magnet-bearing rotor, which may be nested inside the stator or circumscribe the outside of the stator, is separated from the stator by a small air gap. A magnetic field produced by the flow of current through the stator windings interacts with a magnetic field produced by the rotor's magnets, thereby causing the rotor to rotate.

SUMMARY

Presented herein are segmented bar conductors for electric machines, methods for making and methods for using segmented bar conductors, electromagnetic motors using such segmented hairpin windings, and motor vehicles equipped with an multi-phase traction motor using segmented hairpin windings. By way of example, there are presented electrical hairpin windings that are fabricated from multiple wires, which are joined together, e.g., via adhesives, insulation sheath, welding, etc., to form a unitary hairpin bar conductor. The individual wire segments may take on various geometries and dimensions, including closed-curve and polygonal transverse cross-sections, and may take on identical or distinct configurations. Along the same lines, the sizes of the winding segments, be it width, height, length, diameter, or major/minor dimensions, may be designed as a function of peak motor frequency and maximum conductor skin depth. Hairpin bar conductors may include bundled wires that are sectioned in both lateral and longitudinal directions, and wire segment size may vary within each of the hairpin bar conductors. The unitary hairpin-type winding may be formed as a U-shaped assembly with square or circular leg profiles.

Attendant benefits for at least some of the disclosed concepts include segmented hairpin-type windings that provide high slot-fill functionality and reduce material-borne energy losses (e.g., "copper losses") in the electrically conductive windings of electric machines. Disclosed segmented hairpin winding constructions also ameliorate AC skin effect as the machine frequency and speed increase; this, in turn, improves motor efficiency across the motor's full operating speed range. Use of segmented bar conductors may also open the machine design space to consider certain pole-slot combinations that were previously prohibited due to electrical current losses. Other attendant benefits may include motor mass reduction, decreased part cost, offset proximity effects, and minimized design and assembly costs.

Aspects of this disclosure are directed to electric machines and devices, such as motors, generators, transformers, inductors, chokes, AC busbars, etc., that employ electrically conductive, segmented hairpin windings. Presented herein, for example, is an electric machine with a stator having multiple circumferentially spaced, radially elongated stator slots. A rotor, which is packaged adjacent and movable with respect to the stator, includes one or more magnets mounted onto or into the rotor. For at least some applications, the rotor may be rotatably disposed inside a hollow core of the stator. One or more electrically conductive hairpin windings are mounted to the stator in spaced relation to the magnet(s). Each hairpin winding includes multiple electrically conductive wires that are insulated, collimated, and bundled together into a unitary hairpin bar conductor. The hairpin winding has multiple hairpin legs, each of which is connected to a respective end of a hairpin crown and each of which is inserted into a respective one the stator slots.

Other aspects of this disclosure are directed to methods for manufacturing and methods for utilizing any of the disclosed segmented hairpin windings, electric machines, and motor vehicles. In an example, a method is presented for assembling an electric machine. This representative method includes, in any order and in any combination with any of the above and below disclosed options and features: providing a stator that defines a plurality of stator slots; movably mounting a rotor with respect to the stator; mounting one or more magnets onto or into the rotor; and mounting one or more hairpin windings into the stator in spaced relation to the one or more magnets, each of the hairpin windings including a plurality of electrically conductive wires bundled together into a unitary hairpin bar conductor, the hairpin winding having a plurality of hairpin legs connected by a hairpin crown and each being inserted into a respective one the stator slots.

Additional aspects of this disclosure are directed to electric-drive motor vehicles equipped with a traction motor that employs segmented hairpin-type windings to generate rotational energy. As used herein, the terms "vehicle" and "motor vehicle" may be used interchangeably and synonymously to include any relevant vehicle platform, such as passenger vehicles (e.g., hybrid electric, full electric, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive motor vehicle includes a vehicle body with multiple road wheels and other standard original equipment. An electric traction motor is mounted onto the vehicle body and electrically connected to an on-board battery pack, fuel cell stack, or other suitable rechargeable energy storage system (RESS). The traction motor may operate alone (e.g., in a full-electric vehicle (FEV) application) or in conjunction with an internal combustion engine (e.g., in a hybrid-electric vehicle (HEV) application) to drive one or more of the vehicle wheels to thereby propel the vehicle.

Continuing with the above example, the traction motor includes an annular stator that is fabricated with a hollow core and a series of circumferentially spaced stator slots. A cylindrical rotor, which is rotatably disposed inside the hollow core of the annular stator, is fabricated with multiple circumferentially spaced rotor slots. The traction motor also includes permanent magnets that are mounted inside the circumferentially spaced rotor slots of the cylindrical rotor. A plurality of U-shaped hairpin windings is mounted to the stator in juxtaposed spaced relation to the permanent magnets of the rotor. Each hairpin winding includes multiple electrically conductive, mutually parallel wires that are bundled together into a unitary hairpin bar conductor that is encased in an insulative sheath. The hairpin winding has first and second hairpin legs, each of which projects from a respective end of a hairpin crown and each of which is inserted into a respective one the stator slots.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
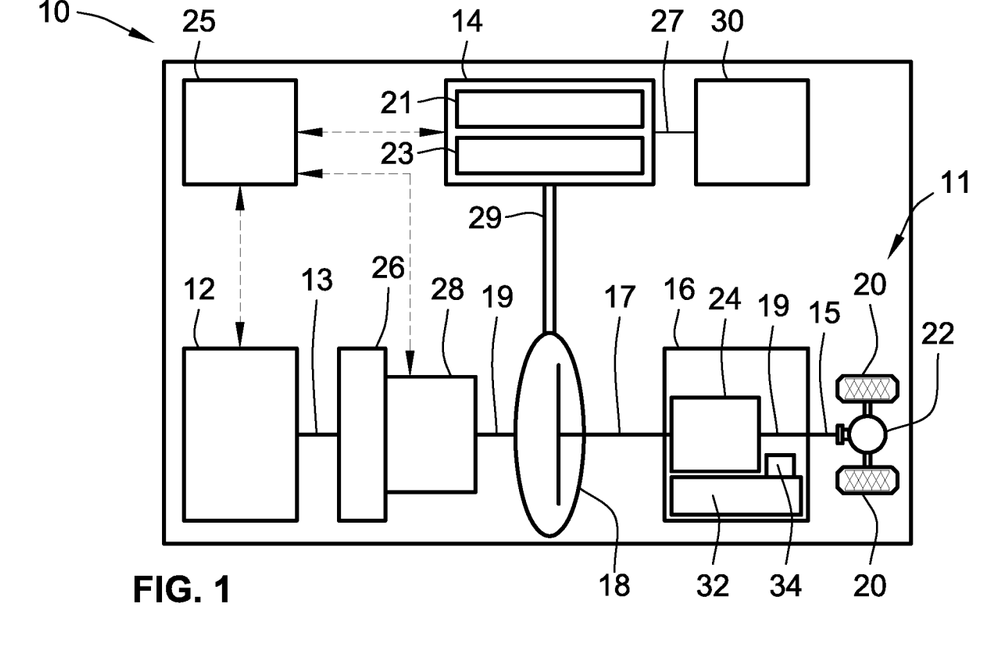
FIG. 1 is a schematic illustration of a representative electric-drive vehicle equipped with a hybrid electric powertrain having a multi-phase induction motor/generator unit (MGU) with a hairpin-wound stator bearing segmented hairpin windings in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure may be practiced. In the same vein, implementation of the present concepts into a multi-phase, synchronous permanent magnet (PM) motor generator unit should also be appreciated as an exemplary application of the concepts disclosed herein. As such, it will be understood that aspects and features of the disclosure can be applied to other electric machine configurations and utilized for any logically relevant type of motor vehicle. Lastly, only select components have been shown and will be described in additional detail herein. Nevertheless, the vehicles and electric machines discussed below can include numerous additional and alternative features, and other available peripheral components, e.g., for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven (first) torsional damper assembly 26 and, through the torsional damper assembly 26, an engine disconnect clutch 28. This engine disconnect clutch 28, when operatively engaged, transmits torque received from the ICE assembly 12 by way of the damper 26 to input structure of the TC assembly 18. The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and hydrokinetic torque converter 18 of FIG. 1 may share a common transmission oil pan or "sump" 32 for supply of hydraulic fluid, as well as a shared transmission pump 34 for sufficient hydraulic pressure to activate the elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled onto a TC input shaft or rigidly mounted to a housing portion of the torque converter 18. The electric motor/generator unit 14 is generally composed of an annular hairpin-wound stator 21 circumscribing and concentric with a cylindrical PM-bearing rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an REV, PHEV, range-extended hybrid vehicle, fuel-cell hybrid vehicle, etc.

Power transmission 16 can use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Figure 2:
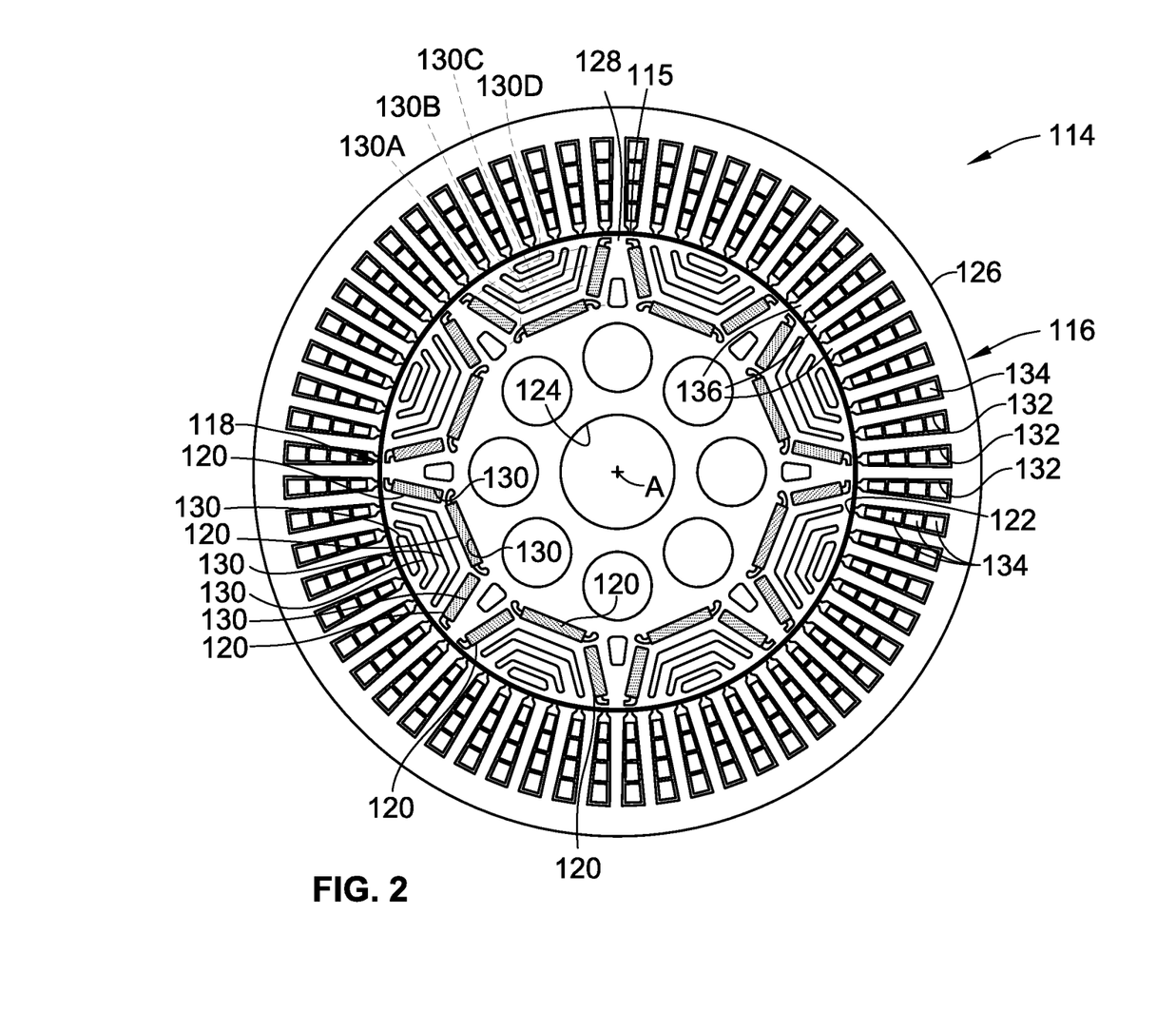
FIG. 2 is a schematic side-view illustration of a representative electric machine with a stator assembly with an annular stator ring bearing multiple segmented hairpin windings and a rotor assembly with a rotor core bearing multiple permanent magnets in accordance with aspects of the present disclosure.

FIG. 2 illustrates another example of an electric machine 114 that employs permanent magnets and hairpin windings to convert electrical energy into mechanical energy, and vice versa. As discussed herein, the electric machine 114 has a multi-phase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced cost (e.g., by minimizing the number of permanent magnets); a reduced mass and inertia (e.g., for fast dynamic response to user output demands); and to fit into a relatively small packaging space. Various alternative embodiments, including alternative rotor assembly architectures and/or alternative stator assembly architectures, may be employed by the electric machine 114 to meet similar or alternative operating parameters.

With continuing reference to FIG. 2, the stator assembly 116 is coaxial with and surrounds the rotor assembly 118 while maintaining a small air gap 115 therebetween. In accord with the illustrated example, this air gap 115 may be not less than about 0.2 millimeters (mm) and not greater than about 1.0 mm, for example, in order to maximize power output and minimize the number of permanent magnets 120 borne by the rotor assembly 118 to provide the desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 122 that nests therein the rotor assembly 118; the rotor assembly 118 has a hollow rotor core 124, e.g., that splines to a motor shaft (not shown). It should be appreciated that a protective motor housing (also not shown) can surround an outer periphery of the stator's body 126 and can support the motor shaft of the electric machine 114.

Rotor assembly 118 of FIG. 2 is fabricated with a rotor body 128 for supporting multiple permanent magnets 120 that are circumferentially spaced around the rotor core 124. Specifically, the rotor body 128 is precision machined with multiple rotor slots 130 arranged in radially spaced barrier layers (e.g., four distinct barrier layers). A first barrier layer 130A of slots 130 may be positioned closest to an inner periphery of the rotor body 128, while a fourth barrier layer 130D of slots 130 may be positioned furthest from the rotor body's inner periphery than the other barrier layers. A second barrier layer 130B of slots 130 may be radially interposed between the first and third barrier layers 130A, 130C, while the third barrier layer 130C of slots 130 may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as air barriers. In other embodiments, only one or all of the barrier layers may comprise slots storing therein permanent magnets. For example, the three radially innermost barrier layers 130A-130C may be filled with magnets 120 while the radially outermost barrier layer 130D does not include magnets 120. The rotor body 128 may be fabricated from a metallic material, including a high-grade steel material, that is engineered to maintain high-speed rotational stress within predetermined limits.

Stator assembly 116 of FIG. 2 is fabricated with a stator body 126 that has multiple radially elongated, circumferentially spaced stator slots 132 (e.g., 60 total slots). These stator slots 132 extend longitudinally through the stator body 126 along the rotational axis A of the electric machine 114. The stator slots 132 are configured to house complementary legs of electrically conductive, multiphase stator windings 134. The stator windings 134—also referred to herein as "hairpin windings" and permutations thereof—may be grouped into different sets, each of which may carry an identical number of phases of electrical current, such as three, five, six, or seven phases. In addition, the stator windings 134 may extend axially beyond the longitudinal ends of the stator body 126. A ratio of an outer diameter of the stator body 126 to an axial length of the stator assembly 116 (i.e., the distance along the axis A between the body's longitudinal ends not including any extending portion of the stator windings 134) may be, by way of non-limiting example, not less than 1.5 and not greater than 3.5, e.g., in order to satisfy predetermined packing space constraints for a particular application of the electric machine 114, such as in the vehicle powertrain of FIG. 1.

For ease of manufacture, simplified assembly, and increased costs savings, it may be desirable that all of the permanent magnets 120 share an identical, rectangular polyhedron shape. It should be recognized, however, that any one or more or all of the PM bodies may take on innumerable shapes and sizes, including other polyhedral block-type magnets, ring-shaped (annular) magnets, bread-loaf block-type magnets (cross-section with quadrilateral section adjoining semioval section), curved tile magnets, etc. In one non-limiting example, each permanent magnet 120 may have a thickness of about 1.5 mm to 2.5 mm to fit within a slot 130 having complementary dimensions. In at least embodiments, a total mass of magnet material (i.e., the mass of all magnets 120) used by the electric machine 114 may be about 150 grams to about 250 grams. By using less magnetic material but still meeting predetermined operating parameters, costs are reduced. The permanent magnets 120 of the electric machine 114 may all be fabricated from the same material, such as Neodymium Iron Boron (NdFeB); alternatively, any one or more or all of the magnets 120 may employ different materials, such as Samarium Cobalt (SmCo), Aluminum Nickel Cobalt (AlNiCo), or any combination of rare earth magnet materials.

Figure 3:
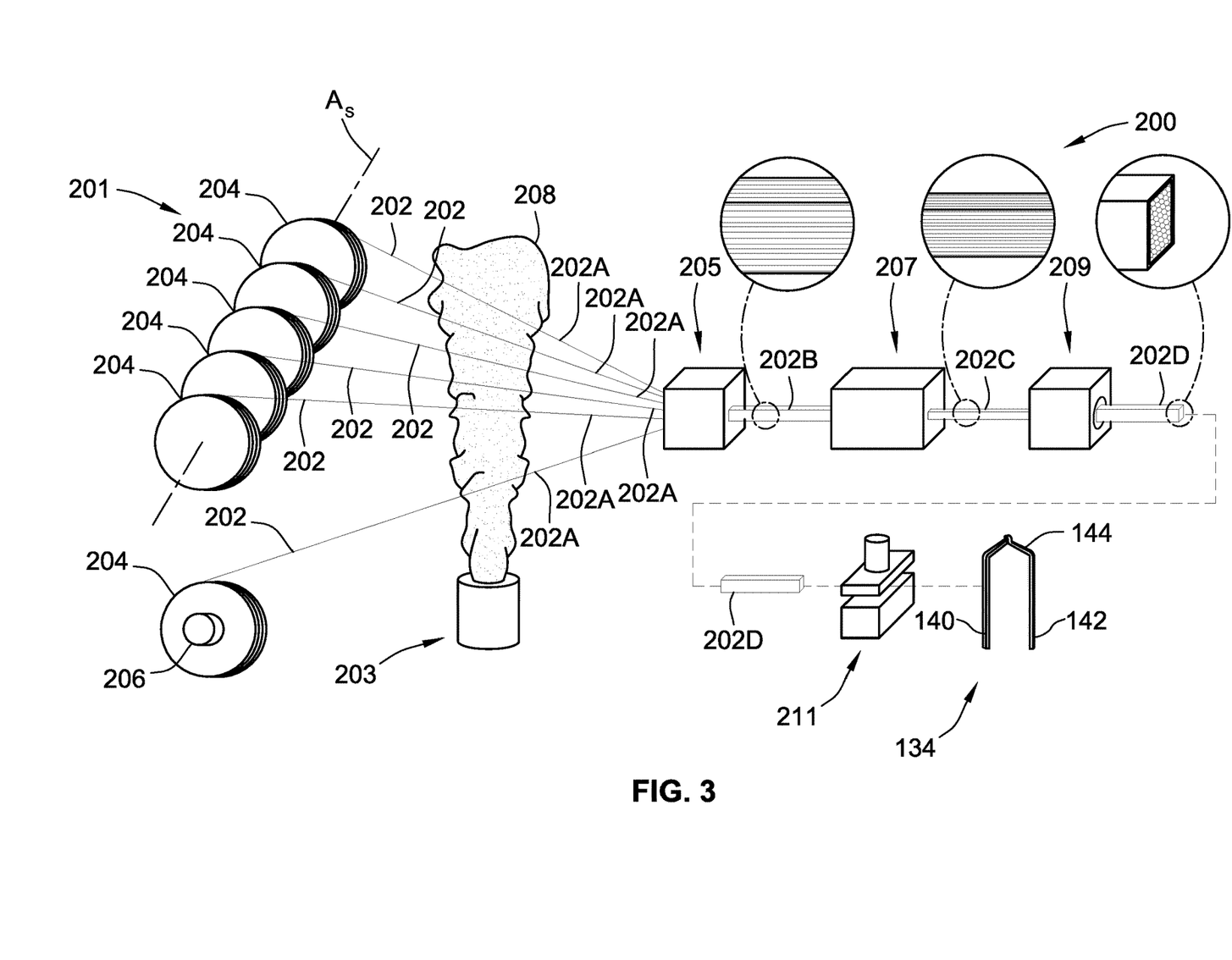
FIG. 3 is a workflow diagram illustrating a representative system and method for manufacturing a segmented hairpin-style bar conductor in accord with aspects of the disclosed concepts.

Similar to the permanent magnets 120 of FIG. 2, it may be desirable that all of the multiphase stator windings 134 share an identical construction, including material composition, method of manufacture, and final geometry. As best seen in FIG. 3, for example, each stator winding 134 is fabricated from a unitary hairpin bar conductor (e.g., unitary hairpin bar section 202D of FIG. 3) that is formed into a U-shaped geometry that is defined by first and second elongated, rectilinear hairpin legs 140 and 142, respectively, that project obliquely or generally orthogonally from opposing ends of a curvilinear hairpin crown 144. The unitary hairpin bar conductor and resultant stator winding 134 may take on a rectangular cross-section (FIG. 4), a square cross-section (FIG. 5), an oval cross-section (FIG. 6), a circular cross-section (FIG. 7), or any other suitable shape. The hairpin legs 140, 142 are inserted into the slots 132 of the stator body 126, with each leg 140, 142 extending through a different stator slot 132 such that the hairpin crown 144 (also known as an "end-turn") extends over several of the stator slots 132 (e.g., each hairpin crown 144 may extend across three or four or five slots). Each hairpin stator winding 134 may be inserted in a "staggered" or "interleaved" pattern with respect to adjacent hairpins. Any given stator slot 132 will include a number of hairpin legs 140, 142 (e.g., four in the illustrated example of FIG. 2). Once all of the hairpin stator windings 134 are inserted into the slots 132 of the stator body 126, the ends of the hairpin legs 140, 142 extending from a longitudinal end of the stator 116 are bent. Electrical connections are then made to each winding 134.

As will be explained in extensive detail below, the multiphase hairpin-type stator windings 134 are high-frequency electrical conduits fabricated from multiple seed wires that are joined together to form "monolithic" hairpin bar conductors. Each seed wire may be cut from a supply spool of extruded copper, copper-clad aluminum, or other suitably conductive wire. The seed wire segments may take on a variety of different dimensions and cross-sectional geometries, including rectangular (FIG. 4), hexagonal (FIG. 5), oval (FIG. 6), circular (FIG. 7), and other closed-curve and polygonal shapes. Cross-sectional dimensions of the individual seed wires may be engineered as a function of the electric machine's operational frequency range and the hairpin conductor's predicted skin depth. Wire segment size may increase/decrease in a radial or transverse direction of the hairpin bar conductor to ameliorate AC proximity and skin effects. In a representative case study employing a mainstream MGU for a battery electric vehicle (BEV), segmented hairpin bar conductors in accord with the present disclosure reduced overall copper losses by a factor of two (2) during high-speed motor operation. Furthermore, use of segmented bar conductors opens the electric machine design space to consider certain pole-slot combinations that were previously unobtainable due to AC losses.

During operation of the electric machine 114, e.g., in a regenerative-charging mode, the rotor assembly 118 is rotated via the motor shaft while the stator assembly 116 is held relatively stationary. In so doing, the permanent magnets 120 are moved past the multiphase stator windings 134; the magnetic field emitted by the permanent magnets 120 generates an electric current in the windings 134 through electromagnetic induction. This induced electric current may be used to power a load (e.g., recharge traction battery pack 30 of FIG. 1). Conversely, during operation of the electric machine 114, e.g., in an engine-cranking mode or a torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor body 128 and attached motor shaft rotate to generate a rotary driving force.

FIG. 3 depicts a representative manufacturing system and attendant manufacturing process (collectively designated as 200) for constructing segmented hairpin-style windings 134 for electric machines, such as traction motor 14 of FIG. 1 or electric machine 114 of FIG. 2. A variety of techniques, elective processes, and system architectures may be utilized to manufacture the hairpin stator winding 134. However, only select segments of the manufacturing system 200 have been shown by way of example in the drawings and will be described in detail hereinbelow. Nevertheless, the manufacturing system 200 of FIG. 3 may include numerous additional and alternative fabrication procedures, as well as other available work cells and equipment, without departing from the intended scope of this disclosure. It should also be recognized that the order of execution of the illustrated operations may be changed, additional operations may be added, and some of the operations described may be modified, combined, or eliminated.

At a first manufacturing station 201, individual strands of bare seed wire 202 having, for example, a circular or rectangular cross-section, are provided in rolled-up, untwisted form on discrete supply spools 204. Each seed wire 202 may have a pre-processed width/diameter of about 2.0-4.0 mm and, optionally, a corrosion and rust resistant surface coating. Aligned in a single file in FIG. 3, the supply spools 204 may be held for rotation about a common horizontal spool axis $A_S$-$A_S$. One or more feeder motors 206 may automate the systematic unwrapping and pay out of the seed wires 202 from the supply spools 204 for undergoing pre-processing before being fabricated into forms suitable for electric machine applications. De-spooled seed wire 202 may undergo chemical stripping and descaling during which the surface is treated with a hydrochloric acid solution or other cleaning and stripping agent in order to remove transport coatings, impurities, contaminants, scale, stains, and rust.

With continuing reference to FIG. 3, the paid-out strands of seed wire 202 are passed through a second manufacturing station 203 to surface treat the seed wires 202 with a surface coating 208. This surface coating 208 may contain, in a non-limiting example, a low-voltage insulative material in order to increase electrical resistance between the seed wire segments. Depending on the intended application of the electric machine, the insulative material may be a cross-linked polyethylene insulation material, a silicone-oxide insulation material, an ethylene propylene rubber insulation material, a polyester-based insulation material, or any combination thereof. For at least some desired applications, the individual seed wire 202 strands are coated with a polyester-imide resin with +180° C. temperature rating. Surface coating 208 may also contain thermoplastic or acrylic high-tack, pressure-sensitive or temperature-sensitive adhesives for bonding together the seed wire 202. An optional layer of varnish may be surface applied in order to reduce current pinch effects. Surface treatment may be accomplished through any suitable technique, including chemical vapor deposition (CVD), oxide layer, polymer coating, sputter coating, wet coating, physical vapor deposition (PVD), etc. Curing of any such surface-level coatings may be provided through a UV lights station, curing oven, or other appropriate means.

Coated wire segments 202A are transferred, e.g., via feed rollers and wire guides (not shown), from the second manufacturing station 203 to a third manufacturing station 205 for collimation of the segments into a compact bundle. The third manufacturing station 205 may be furnished with motor-driven wire straighteners positioned to straighten the wire segments 202A in a horizontal direction and then in a vertical direction, e.g., by repeatedly bending the wire back and forth in the corresponding directions, until the individual wires emerge substantially bend-free. A serially arranged electronic wire collimator is operable to align the straightened, coated wire segments 202A into mutually parallel, abutting relation with one another to form a bar conductor precursor 202B. The bar conductor precursor 202B may be retained in a compact package via an optional connector fitting or strap or via brazing, spot welding or soldering.

The collimated and bundled bar conductor precursors 202B are transferred to a fourth manufacturing station 207 for interconnecting of the several wire segments and shaping to a desired final shape and dimensions. At this juncture of manufacture, the bar conductor precursor 202B is fed, e.g., via servo motor and feeder arms, through an extruder with a frustaconical or pyramidal-frustum die to produce a compressed and bonded bar conductor bundle 202C. For maximum bond strength in applications in which a self-bonding, pressure-sensitive adhesive coating was administered, heat may also be applied at the fourth manufacturing station 207 to elevate application temperatures to about 100° F. to 130° F., causing the adhesive to develop intimate contact with the bonding surfaces. It may be desirable that the adhesive coating be embodied as a high-tact, high-temperature acrylic or modified-acrylic PSA with an operating range of about −20 to 450° F. and with a bonding strength of at least about 100 to 150 oz/in. For round segment wire, the workpiece may undergo suitable wire twisting and/or transposition techniques.

After extrusion and bonding, the bar conductor bundle 202C is transferred from the fourth manufacturing station 207 to a fifth manufacturing station 209 for coating the assembled bar conductor bundle 202C with a high-voltage insulation material. In accord with the representative manufacturing system 200, an enamel coating may be applied and bonded directly on the bar conductor bundle 202C. Alternative configurations may employ a friction-fit or shrink-wrapped synthetic, semi-aromatic polyamide or polyethylene insulation sleeve that sheaths therein the bar conductor bundle 202C. This step in the processing sequence may further include cutting the bundled wire to length as discrete unitary hairpin bar sections 202D. The individual unitary hairpin bar sections 202D are transferred to a sixth manufacturing station 211 to be formed into the U-shaped hairpin stator winding 134.

In accord with aspects of the disclosed concepts, it may be ideal that the size of the individual seed wires in any transverse direction is less than or about equal to a skin depth of the segmented bar conductor at a highest operating frequency of the electric machine for which it is intended. As with any AC-carrying conductor, the unitary hairpin bar has a maximum conductor skin depth at a peak operating frequency of the electric machine. As used herein, the term "skin effect" should be given its ordinary and customary meaning as understood by persons of ordinary skill in the art. In this regard, skin effect may be typified as the tendency of an alternating electric current to distribute in a non-uniform manner within an elongated conductor such that the current density is largest near the surface of the conductor, and decreases with greater depths as one moves inward towards the center of the conductor. The electric current tends to avoid travel through the center of the solid conductor, and flows mainly at the "skin" of the conductor, between the outer surface and a level called the "skin depth". The skin depth refers to the point at which the current density reaches approximately 37% of its value at the surface of the conductor. Each of the electrically conductive seed wires has a transverse cross-section with a largest dimension (e.g., a diameter, a width, a semi-major dimension, etc.) that is about equal to or less than the maximum conductor skin depth of the unitary hairpin bar. The maximum conductor skin depth may be calculated as:

$$\delta_{MAX} = \sqrt{\frac{2\rho}{\mu \omega_{MAX}}}$$

where $\delta_{MAX}$ is the maximum conductor skin depth of the unitary hairpin bar; $\rho$ is an electrical resistivity of an electrically conductive material of the wires; $\omega_{MAX}$ is a maximum angular current frequency as a function of the peak operating frequency of the electric machine; and $\mu = \mu_r \mu_0$, where $\mu_0$ is a vacuum permeability and $\mu_r$ is a relative magnetic permeability of the electrically conductive material of the wires.

Figure 4:
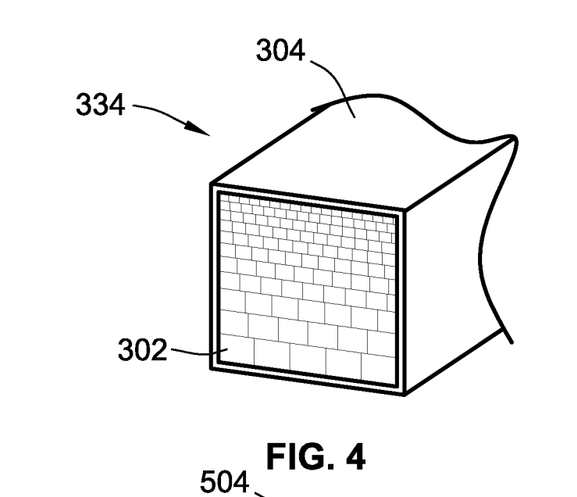
FIGS. 4-7 are isometric end-view illustrations of different representative segmented hairpin windings fabricated from bundles of electrically conductive wire segments with different cross-sectional geometries in accordance with aspects of the present disclosure.
Figure 5:
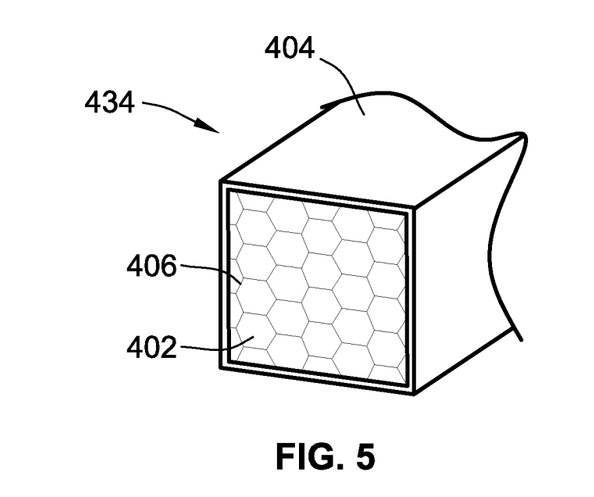

FIGS. 4-7 provide end-view illustrations of different representative segmented hairpin windings 334, 434, 534 and 634 that are fabricated from bundled seed wires of different cross-sectional geometries. By way of example, and not limitation, the segmented hairpin winding 334 of FIG. 4 is composed of rectangular seed wires 302 (i.e., seed wires having a right-rectangular transverse cross-section) that are mutually parallel and bundled into an array of wire rows in which the width and height of the individual wires 302 progressively increase from a first side to a second side (e.g., from top-to-bottom in FIG. 3) of the winding 334. An electrically insulative sheath 304 encases therein the bundled electrically conductive wires 302. Once assembled and formed, the hairpin winding 334 of FIG. 4 has a rectangular profile. By comparison, the segmented hairpin winding 434 of FIG. 5 is composed of a honeycomb-like arrangement with hexagonal wires 402, which may have taken on this final shape through compression of circular seed wires, as indicated by the inset view of FIG. 3. The hexagonal wires 402 are mutually parallel and bundled into an array of wire rows and wire columns. A pressure-sensitive adhesive 406 bonds the individual wires 402 to coterminous, neighboring wires. An electrically insulative sheath 404 encases therein the bundled electrically conductive wires 402. Once assembled and formed, the hairpin winding 434 of FIG. 5 has a square profile.

Figure 6:
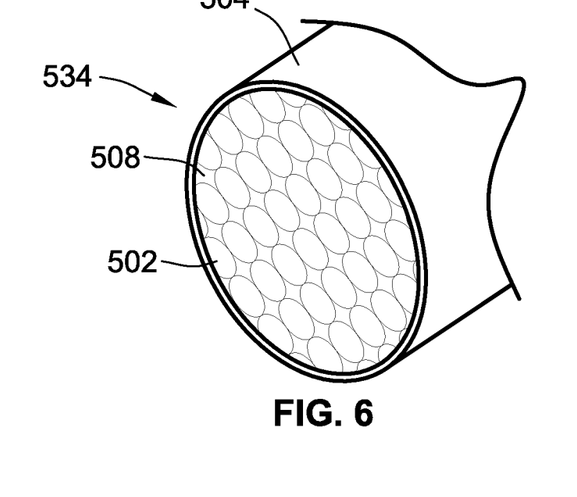
Figure 7:
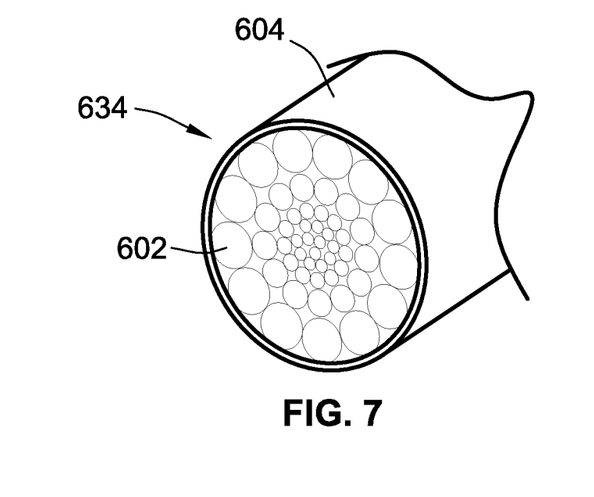

With reference next to FIG. 6, the segmented hairpin winding 534 is composed of oval-shaped seed wires 502 that are mutually parallel and bundled into an inline-square array with a pitch-to-diameter ratio of about 1.5. An electrically insulative sheath 504 encases therein the bundled electrically conductive wires 502. A low-voltage insulative coating 508 is interleaved between and surrounds the individual seed wires 502. Once assembled and formed, the hairpin winding 534 of FIG. 5 has an ovate profile. As a point of comparison, the segmented hairpin winding 634 of FIG. 7 is composed of uncompressed circular seed wires 602 that are mutually parallel and bundled into a hub-and-spoke pattern in which the diameters of the seed wires 602 progressively decrease from an exterior surface to a center (e.g., in a radially inward direction in FIG. 7) of the winding 634. An electrically insulative sheath 604 encases therein the bundled electrically conductive wires 602. Once assembled and formed, the hairpin winding 634 of FIG. 7 has a circular profile. While differing in appearance, it is envisioned that any of the features disclosed with reference to the examples of FIGS. 4-7 may be incorporated, singly or in any combination, into each other and into the examples of FIGS. 1-3, and vice versa.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine comprising:
   a stator defining a plurality of stator slots;
   a rotor adjacent and movable with respect to the stator;
   a magnet mounted to the rotor; and
   a hairpin winding mounted to the stator in spaced relation to the magnet, the hairpin winding including a plurality of electrically conductive wires having a circular cross-section, arranged in a plurality of parallel rows, and bundled together into a unitary bar conductor, the hairpin winding having a plurality of hairpin legs connected by a hairpin crown, the hairpin legs each being inserted into a respective one the stator slots,
   wherein the unitary bar conductor has a maximum conductor skin depth at a peak operating frequency of the electric machine, and wherein each of the electrically conductive wires has a transverse cross-section with a largest dimension that is about equal to or less than the maximum conductor skin depth of the unitary bar conductor,
   wherein the electrically conductive wires include a first plurality of wires arranged in a first row and having a first transverse cross-section with a first size, a second plurality of wires arranged in a second row, abutting the first row, and having a second transverse cross-section with a second size, less than the first size, and a third plurality of wires arranged in a third row, abutting the second row, and having a third transverse cross-section with a third size, less than the second size.

2. The electric machine of claim 1, wherein the maximum conductor skin depth is calculated as:

$$\delta_{MAX} = \sqrt{\frac{2\rho}{\mu\omega_{MAX}}}$$

where $\delta_{MAX}$ is the maximum conductor skin depth of the unitary bar conductor; $\rho$ is an electrical resistivity of an electrically conductive material of the electrically conductive wires; $\omega_{MAX}$ is a maximum angular current frequency as a function of the peak operating frequency of the electric machine; and $\mu=\mu_r\mu_0$, where $\mu_0$ is a vacuum permeability and $\mu_r$ is a relative magnetic permeability of the electrically conductive material of the electrically conductive wires.

3. The electric machine of claim 1, wherein each of the transverse cross-sections of the electrically conductive wires has a cross-sectional area, and wherein the cross-sectional areas of the bundled wires progressively decrease from a first side to a second side of the unitary bar conductor.

4. The electric machine of claim 1, wherein the hairpin winding further includes an electrically insulative sheath encasing therein the bundled electrically conductive wires.

5. The electric machine of claim 1, wherein each of the electrically conductive wires includes a pressure-sensitive adhesive bonding the electrically conductive wire to neighboring ones of the electrically conductive wires.

6. The electric machine of claim 1, wherein each of the electrically conductive wires includes a low-voltage insulative coating.

7. The electric machine of claim 1, wherein the electrically conductive wires are collimated in abutting relation with one another.

8. The electric machine of claim 1, wherein the electrically conductive wires are mutually parallel and bundled into a square array of wire rows and wire columns.

9. The electric machine of claim 1, wherein each of the electrically conductive wires is an elongated strand of copper wire or copper-clad aluminum wire.

10. The electric machine of claim 1, wherein the hairpin winding has a U-shaped geometry with a first of the hairpin legs adjoining and projecting from a first end of the hairpin crown and a second of the hairpin legs adjoining and projecting from a second end of the hairpin crown opposite the first end.

11. The electric machine of claim 10, wherein each of the hairpin legs has a circular or rectangular transverse cross-section.

12. An electric machine comprising:
    a stator defining a plurality of stator slots;
    a rotor adjacent and movable with respect to the stator;
    a magnet mounted to the rotor; and
    a hairpin winding mounted to the stator in spaced relation to the magnet, the hairpin winding including a plurality of electrically conductive wires having a polygonal cross-section, arranged in a plurality of mutually parallel and abutting rows, and bundled together into a unitary bar conductor, the hairpin winding having a plurality of hairpin legs connected by a hairpin crown, the hairpin legs each being inserted into a respective one the stator slots, wherein a width and a height of the electrically conductive wires progressively increase, row by row, from a first side to a second side of the unitary bar conductor,
    wherein the unitary bar conductor has a maximum conductor skin depth at a peak operating frequency of the electric machine, and wherein each of the electrically conductive wires has a transverse cross-section with a largest dimension that is about equal to or less than the maximum conductor skin depth of the unitary bar conductor.

13. The electric machine of claim 12, wherein each of the transverse cross-sections of the electrically conductive wires has a cross-sectional area, and wherein the cross-sectional areas of the bundled electrically conductive wires progressively decrease from an exterior to a center of the unitary bar conductor.

14. The electric machine of claim 12, wherein each of the transverse cross-sections of the electrically conductive wires has a square, rectangular, and/or hexagonal shape.

15. The electric machine of claim 12, wherein the plurality of mutually parallel and abutting rows includes a first row abutting a second row abutting a third row, the first row containing a first series of the electrically conductive wires having a first width and a first height, the second row containing a second series of the electrically conductive wires having a second width and a second height, and the third row containing a third series of the electrically conductive wires having a third width and a third height.

16. The electric machine of claim 12, wherein the hairpin winding further includes an electrically insulative sheath encasing therein the bundled electrically conductive wires.

17. The electric machine of claim 12, wherein each of the electrically conductive wires includes a pressure-sensitive adhesive bonding the electrically conductive wire to neighboring ones of the electrically conductive wires.

18. The electric machine of claim 12, wherein each of the electrically conductive wires includes a low-voltage insulative coating.

* * * * *